(12) United States Patent
Kimura et al.

(10) Patent No.: US 6,299,807 B1
(45) Date of Patent: *Oct. 9, 2001

(54) METHOD FOR PRODUCING MOLDED ARTICLE

(75) Inventors: Mikihiko Kimura, Sayama; Michio Yoshizaki; Kouichi Honda, both of Ichihara, all of (JP)

(73) Assignees: Honda Giken Kogyo Kabushiki Kaisha; Chisso Corporation, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/370,268

(22) Filed: Aug. 9, 1999

Related U.S. Application Data

(62) Division of application No. 08/958,938, filed on Oct. 28, 1997, now Pat. No. 5,972,491.

(30) Foreign Application Priority Data

Nov. 1, 1996 (JP) .................................................. 8-292099

(51) Int. Cl.⁷ .................................................. B29C 44/06
(52) U.S. Cl. ........................................... 264/45.5; 264/54
(58) Field of Search ............................... 264/45.5, 328.7, 264/54

(56) References Cited

U.S. PATENT DOCUMENTS

| | | |
|---|---|---|
| 3,721,197 | 3/1973 | Hughes . |
| 3,793,415 | 2/1974 | Smith . |
| 4,278,769 * | 7/1981 | Gebauer et al. ........................ 521/90 |
| 4,370,373 | 1/1983 | Janicz . |
| 4,952,365 * | 8/1990 | Shibuya et al. ...................... 264/40.3 |
| 5,049,327 * | 9/1991 | Hara et al. ........................... 264/45.5 |
| 5,100,716 | 3/1992 | Juneau . |
| 5,160,772 | 11/1992 | Futami . |
| 5,207,964 * | 5/1993 | Mauro .............................. 264/328.14 |
| 5,437,823 * | 8/1995 | Hettinga et al. .................... 264/45.5 |
| 5,474,723 * | 12/1995 | Horikoshi ............................ 264/45.5 |
| 5,478,627 | 12/1995 | Hara . |
| 5,645,779 * | 7/1997 | Matsumoto ......................... 264/45.5 |
| 5,658,652 | 8/1997 | Sellergren . |

FOREIGN PATENT DOCUMENTS

| | | |
|---|---|---|
| 0 664 196 A1 | 7/1995 | (EP) . |
| 2059818 A | 6/1971 | (FR) . |
| 2707549 A | 1/1995 | (FR) . |
| 57066798A | 4/1982 | (JP) . |
| 08300391 | 11/1996 | (JP) . |
| 08300392 | 11/1996 | (JP) . |
| WO 98/10912 | 3/1998 | (WO) . |

* cited by examiner

Primary Examiner—Allan R. Kuhns
(74) Attorney, Agent, or Firm—Kilpatrick Stockton LLP

(57) ABSTRACT

An object is to provide a thermoplastic resin molded article concurrently having excellent heat insulating properties, rigidity, and lightness, and to provide a method for producing the same. A molded article made from a thermoplastic molding material comprises: a multilayer structure portion having a surface layer composed of a non-foamed type of said molding material and an internal layer composed of a foamed type of said molding material; and a portion composed of only a non-foamed type of said molding material. The molded article is produced by injecting and filling an expandable thermoplastic molding material which is melted in the heating cylinder that is adjusted to have the temperature of its tip part higher than that of its rear part, into a cavity having a 10 to 95% volume of the volume of the molded article, conducting a first cooling until the molding material becomes the condition that the surface layer contacted with the metal mold is solidified but the internal layer is melted, enlarging the volume of the cavity to the volume of the molded article to foam at least a part of the internal layer, and conducting a second cooling to take out the molded article.

2 Claims, 7 Drawing Sheets

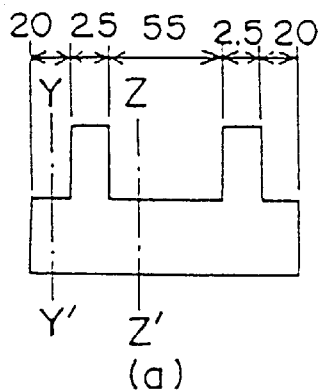
(a)
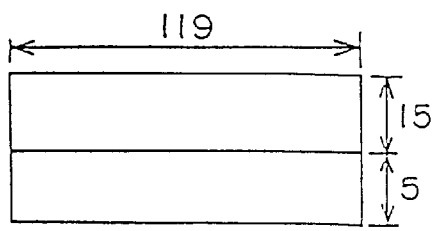
(b)
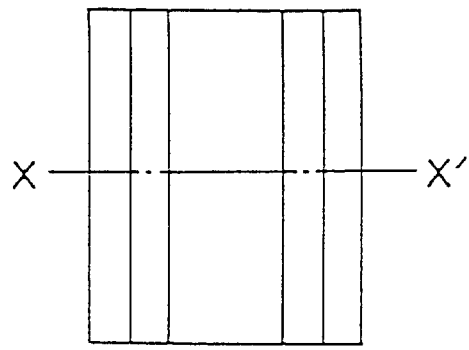
(c)
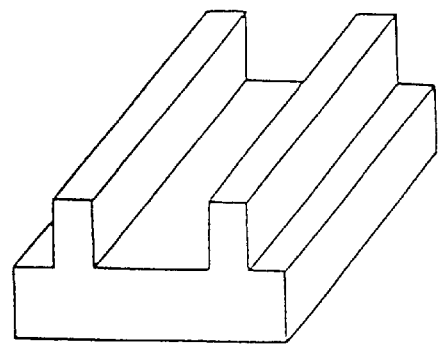
(d)
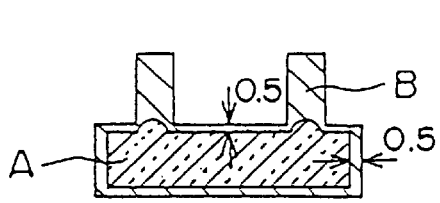
(e)
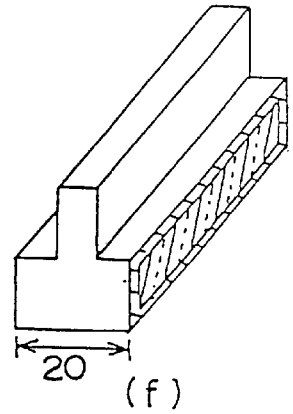
(f)
F I G. 1

(a)

(b)

(c)

(d)

(e)

(f)

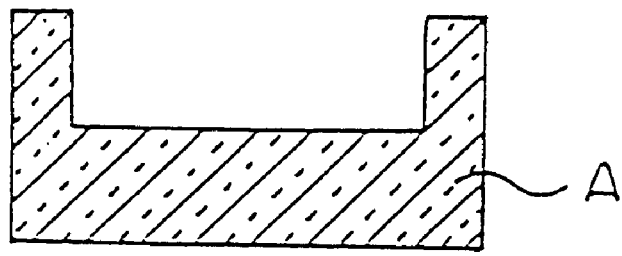
F I G. 6
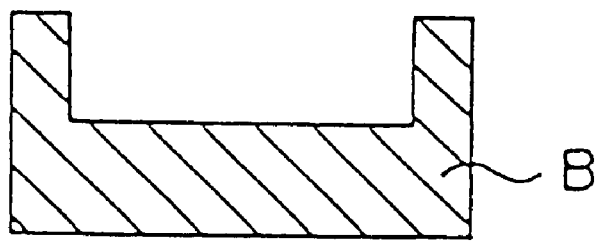
F I G. 7

METHOD FOR PRODUCING MOLDED ARTICLE

This application is a division of application Ser. No. 08/958,938, filed Oct. 28, 1997, now U.S. Pat. No. 5,972,491.

TECHNICAL FIELD

The present invention relates to a molded article composed of a thermoplastic molding material and a method for producing the same. More specifically, the present invention relates to a molded article excellent in heat insulating properties, rigidity, and lightness, and is suitable for parts of vehicles, parts of electrical appliances, heat or cold insulating containers, and the like, and a method for producing the same.

DESCRIPTION OF THE PRIOR ART

Molded articles made from a foamed thermoplastic resin or molded articles made from a foamed composition containing a thermoplastic resin and a filler have conventionally been proposed as thermoplastic molded articles for use in various usages.

Many of these molded articles used for parts of vehicles such as automobiles and motor cycles, and parts of electrical appliances such as copying machines, printers, and air conditioners, are required in particular to have heat insulating properties in order to block heat conduction from engines and motors. Therefore, an attempt has been made often to use expandable molding materials. Some of daily necessities, for example, heat or cold insulating containers such as a cooling box are also required to be adiabatic and many of them are composed of molded articles made from expandable molding materials.

However, if expandable materials are used to give heat insulating properties on the resulting molded article, the rigidity of the entire molded article tends to lower. It is conceivable to add a filler to molding materials in order to improve rigidity, however it is not easy to obtain sufficient rigidity by adding a small amount of a filler when expandable materials are used. If a filler is added in a large amount, the weight of molded articles is increased. Since lightness is usually required for the above-described parts, it is disadvantageous to lose lightness.

On the contrary, it was reported that lightness and rigidity could be improved when an integrally molded article made from low-foaming synthetic resin having a non-foamed layer on its surface was used for a spin-drier of a washing machine (Japanese Patent Application Laid-open No. 57-66798). However, since the molded article as a whole, including its side parts, is made from the low-foaming synthetic resin, its rigidity, particularly against load from upside, cannot be said to be sufficiently high.

Accordingly, it has been desired to develop a molded article having both of rigidity and lightness, and is excellent in heat insulating properties.

SUMMARY OF THE INVENTION

An object of the present invention is to provide a thermoplastic molded article concurrently having excellent heat insulating properties, rigidity, and lightness, and to provide a method for producing the same.

As a result of intensive investigation, the present inventors have found that the above object can be achieved by a molded article comprising a portion of a multilayer structure having a non-foamed surface layer and an internal foamed layer, and a non-foamed portion, and thus the present invention has been completed.

The present invention provides a molded article made from a thermoplastic molding material, which comprises: a portion of a multilayer structure having a surface layer composed of a non-foamed type of said molding material and an internal layer composed of a foamed type of said molding material; and a portion composed of only a non-foamed type of said molding material.

The present invention further provides a method for producing a molded article by subjecting a thermoplastic molding material to injection molding using an injection molding machine equipped with a metal mold and a heating cylinder, which comprises:

a) an injection step in which the expandable thermoplastic molding material melted in the heating cylinder that is adjusted to set the temperature of its tip part to be higher than that of its rear part is injected and filled into a cavity of the metal mold having a volume of 10 to 95% of the volume of the molded article;

b) a first cooling step in which, after injection and filling, the molding material is cooled to give such a condition that a surface layer contacted with the metal mold is solidified, while an internal layer is melted;

c) a foaming step in which, after cooling, the volume of the cavity is enlarged to the volume of the molded article to foam a part of the internal layer; and d) a second cooling step in which, the molding material is further cooled and then the resulting molded article is taken out from the metal mold.

The molded article according to the present invention comprises: a portion of a multilayer structure having a dense surface layer composed of a non-foamed molding material (hereinafter sometimes referred to as "a non-foamed layer") and an internal layer composed of a foamed molding material (hereinafter sometimes referred to as "a foamed layer"); and a dense portion composed of only a non-foamed molding material, thereby achieving remarkably high rigidity throughout the whole molded article as well as improved lightness and heat insulating properties.

According to the method of the present invention, a molded article comprising a portion of a multilayer structure and a non-foamed portion can be efficiently produced by an integral molding using a single metal mold. Thus, the present method is economically advantageous and it enables to provide a molded article excellent in its appearance.

The molded article of the present invention concurrently has excellent heat insulating properties, rigidity, and lightness, and is suitable for use in parts of vehicles, parts of electric appliances, heat or cold insulating containers, and the like. Further, the method of the present invention enables to efficiently produce such a molded article additionally having excellent appearance.

The present invention is described in detail below.

(1) Thermoplastic Molding Material

The thermoplastic molding material used in the present invention is not particularly limited as long as it contains as a main component thermoplastic resin capable of repeating such a cycle that it softens and fluidizes as the temperature raises when it is heated and converted into the form that is comparatively rigid and has strength when it is cooled. If necessary, various fillers and additives can be contained.

Examples of such thermoplastic resin include polyolefin resin such as polypropylene, polyethylene, or the like, polystyrene, polyvinyl chloride, polyvinylidene chloride, methacrylate resin, ABS resin, polyvinyl alcohol, ethylene-vinylacetate copolymer, polyamide resin, polycarbonate, polyethylene telephthalate, polybutylene telephthalate, and the like.

Of those, polypropylene is particularly preferred because a comparatively light molded article can be produced from it. As such polypropylene, either of propylene homopolymer or propylene-α-olefin copolymer can be used. α-Olefin used as a component of the above-described copolymer includes ethylene, 1-butene, 1-pentene, 1-hexene, 1-octene, 1-decene, 1-dodecene, 4-methyl-1-pentene, 3-methyl-1-pentene, and the like. It is preferable that the amount of α-olefin unit in propylene-α-olefin copolymer is not more than 10% of the total constituting unit.

Alternatively, a resin composition containing propylene homopolymer and propylene-α-olefin copolymer can be used. Such a resin composition may be a mixture prepared by melting and kneading propylene homopolymer and propylene-α-olefin copolymer or a product produced by multistage polymerization using plural polymerizers. Examples of the product obtained by multistage polymerization include a composition containing propylene homopolymer and propylene-α-olefin copolymer (commonly called block copolymer) obtained by producing propylene homopolymer at the first stage and producing propylene-α-olefin copolymer at the second stage.

The thermoplastic resin used in the present invention may also include modified polymer such as modified polypropylene by unsaturated monomers or the like.

The melt flow rate (hereinafter referred to as "MFR") of polypropylene used based on the test condition 14 (230° C.; 21.18 N) in accordance with JIS(Japanese Industrial Standard)-K-7210 is preferably 1 to 200 g/10 min, more preferably 2 to 100 g/10 min, particularly preferably 4 to 50 g/10 min, for the reason that molded articles whose thickness is thin can be easily formed.

The thermoplastic molding material of the present invention may contain fillers, additives, and the like, if necessary. The filler may be either organic fillers or inorganic fillers. Specific examples thereof include glass fiber, mineral fiber, calcium carbonate, talc, kaolin clay, mica, quartz powder, diatomaceous earth, barium sulfate, pumice powder, pulp powder, carbon fiber, synthetic fiber, glass hollow fiber, and the like. Among these, particularly preferred are glass fiber, talc, or mica. The filler can be contained preferably in an amount of 5 to 50 wt % based on the total weight of the molding material for the reason that the molded articles excellent in rigidity and lightness can be obtained.

When glass fiber is mixed with polypropylene as a filler to give the thermoplastic molding material, modified polypropylene can be preferably used as polypropylene because it shows excellent compatibility with glass and highly rigid molded articles can be obtained.

The additives include a plasticizer, a stabilizer, an antioxidant, a weathering-preventing agent, a ultraviolet-absorbing agent, a colorant, a lubricant, an antistatic agent, a flame retarder, an elastomer, and the like. The foaming agent as described below or its decomposed product may remain during the process of producing the molded article, and be contained in the molding material, particularly the non-foamed type of the molding material.

(2) Molded Articles

The thermoplastic molded articles of the present invention is made from the above-described thermoplastic molding material and a part of the molded article comprises a multilayer structure portion having a surface layer (non-foamed layer) composed of the non-foamed molding material and an internal layer (foamed layer) composed of the foamed molding material.

The term "non-foamed" used herein means completely not foamed or extremely low foamed condition that the foaming rate is not more than 1.1. The non-foamed layer is a layer having a dense structure composed of such a molding material. The term "foamed" means the foamed condition, specifically, in such a manner that the foaming rate is not less than 1.2, preferably 1.5 to 10. The foamed layer is a highly foamed layer composed of a molding material in such a state.

The surface layer means a layer constituting a surface (outer shell) of the molded article of the present invention and the internal layer means a layer constituting the inside (internal core) surrounded by the above surface layer. The proportion of the thickness of the surface layer (the sum of the thickness of the surface layers at both sides of the internal layer) to the thickness of the whole multilayer structure portion ranges preferably from 5 to 50%. If it is lower than 5%, rigidity is considerably reduced, while if it exceeds 50%, lightening and adiabatic effects are considerably reduced.

If the thickness of the surface layer is fallen within the above range, the molded article having excellent rigidity, lightness, and heat insulating properties can be obtained. In contrast, rigidity is lowered if the surface layer is too thin, while lightness becomes unsatisfactory and sometimes adiathermamous is also reduced if the surface layer is too thick.

Specifically, the thickness of the surface layer (the thickness of one side of the surface layer) ranges preferably from 0.2 to 2 mm, more preferably from 0.3 to 1 mm, particularly preferably from 0.3 to 0.8 mm.

The molded article of the present invention concurrently has a portion of a multilayer structure (hereinafter sometimes referred to as "multilayer structure portion") and a portion of a dense structure composed of only the non-foamed molding material (hereinafter sometimes referred to as "non-foamed portion"). The multilayer structure portion and the non-foamed portion may be combined in any way to form the molded article. Specifically exemplified is a molded article having a bottom part and at least one side part, in which an angle between the bottom part and the side part is 75 to 135°. In this case, it is preferable that one of the bottom part and the side part is formed by the multilayer structure portion and the other is formed by the non-foamed portion. Furthermore it is preferable that the bottom part is formed by the multilayer structure portion and the side part is formed by the non-foamed portion. When the side part is formed by the non-foamed portion having a dense structure, rigidity of the whole molded article is improved. Particularly, rigidity against load from upside is improved.

Another example of the molded article of the present invention may be a box-type molded article having a bottom part and a side part, in which the bottom part is formed by the multilayer structure portion and the side part is formed by the dense structural non-foamed portion.

Alternatively, the molded article may comprise plural multilayer structure portions each containing a foamed layer having a different foaming rate from each other. An example thereof may be a molded article having a slope area at the end of the bottom part or the like, in which the foaming rate of the foamed layer is different between the flat area and the slope area of the bottom part.

Although the size of the molded article is not particularly limited, that having a volume of approximately 20 to 5,000 cc is preferred.

The molded articles of the present invention are used as parts for industrial use, specifically, parts of vehicles, parts of electrical machinery and apparatus, and the like. The molded articles are also used for daily necessaries, for example, heat and cold insulating containers and the like. Examples of the parts of vehicles include exterior members of motor cars (e.g., bumper, fender), interior members of motor cars (dash boards, lit), parts of motor cycles such as a kaul, a fender, a passenger-protective equipment, or a glove compartment, and the like. Examples of the parts of electrical machinery and apparatus include chassis of copying machines, printers, air conditioners, and the like. The heat and cold insulating containers are exemplified by a cooling box, an adiabatic panel, and the like.

(3) Method for Producing the Molded Article

The following method is exemplified as the method for producing the molded article according to the present invention.

Namely, the molded article is produced by subjecting the thermoplastic molding material to injection molding that is carried by the method comprising a) an injection step, b) a first cooling step, c) a foaming step, and d) a second cooling step, using an injection molding machine equipped with a metal mold and a heating cylinder.

a) Injection Step

In this step, the expandable thermoplastic molding material melted in the heating cylinder is injected and filled in the cavity of the metal mold.

As the expandable thermoplastic molding material used in this step, a mixture prepared by adding a foaming agent to the above mentioned thermoplastic molding material is used. Examples of the foaming agent include inorganic compounds such as ammonium carbonate, sodium bicarbonate, or the like, organic compounds such as azo compounds, sulfohydrazide compounds, nitroso compounds, azide compounds, or the like. The azo compounds are exemplified by azodicarbonamide (ADCA), 2,2-azoisobutyronitrile, azohexahydrobenzonitrile, diazoaminobenzene, and the like. The sulfohydrazide compounds include benzenesulfohydrazide, benzene-1,3-disulfohydrazide, diphenylsulfon-3,3-disulfohydrazide, diphenyloxido-4,4-disulfohydrazide, and the like. The nitroso compounds include N,N-dinitrosopentamethylenetetramine (DNPT), N,N-dimethyltelephthalate, and the like. The azide compounds include telephthalazide, p-tert-butylbenzazide, and the like.

The expandable thermoplastic molding material can be prepared by, for example, adding a foaming agent to the thermoplastic molding material described above in an amount of 0.5 to 5 wt % based on the weight of the thermoplastic molding material and subjecting the resulting mixture to dry blending using a tumbler or the like.

The thus-obtained expandable thermoplastic molding material is melted in the heating cylinder and injected into the cavity. In this occasion, the set temperature of the tip part of the inside of the heating cylinder is adjusted to be higher than the set temperature of its rear part so as to suppress foaming of the expandable thermoplastic molding material in the cylinder. Therefore, the molding material can be introduced into the cavity in the non-foamed state and it is economically advantageous in that the amount of the foaming agent can be reduced. The tip part of the heating cylinder means the region closest to a nozzle part which is connected to the metal mold in the cylinder, while the rear part means the region closest to the hopper part for introducing the molding material. The difference between the set temperature of the tip part and that of the rear part ranges preferably from 20 to 100° C., more preferably from 20 to 70° C., particularly preferably from 30 to 60° C. The temperature of the heating cylinder can usually be adjusted using plural band heaters or the like, which cover the certain region. Therefore, the desired temperature difference between the tip part and the rear part can be set by adjusting the set temperature of each band heater to give a difference in the temperature within the above-described range.

The back pressure at the time of injection and filling is preferably adjusted to not less than 50 kg/cm$^2$, which makes it possible to suppress foaming of the molding material in the heating cylinder. The back pressure is more preferably not less than 70 kg/cm$^2$, particularly preferably not less than 100 kg/cm$^2$. In this way, the expandable thermoplastic molding material is injected and filled in the metal mold for injection molding in the non-foamed state.

The volume of the cavity of the metal mold at the time of injection and filling is 10 to 95%, preferably 20 to 70% of the volume of the desired molded article. Within this range, the volume of the cavity can be determined taking account of the total volume of the desired molded article and the volume and the desired foaming rate of the foamed layer in the multilayer structure portion of the molded article.

Specifically, the volume of the cavity at the time of injection and filling can be calculated by dividing the volume of the foamd layer in the multilayer structure portion of the desired molded article by the desired foaming rate of the foamed layer and adding the resulting volume, the volume of the non-foamed surface layer of the multilayer structure portion and the volume of the non-foamed portion of the desired molded article. For example, if the foaming rate of the foamed layer in the multilayer structure portion of the desired molded article is 2, the volume of the cavity at the time of injection and filling may be adjusted to the volume calculated by adding a 50% volume of the volume of the foamed layer in the multilayer structure portion, the volume of the non-foamed surface layer of the multilayer structure portion and the volume of the non-foamed portion of the desired molded article.

If the volume of the cavity at the time of injection and filling is less than 10% volume of the volume of the desired molded article, the gradient of the pressure forced on the expandable thermoplastic molding material at the time of filling becomes large, which sometimes prevents uniform filling. On the other hand, the volume of the cavity exceeds 95%, the pressure forced on the expandable thermoplastic molding material at the time of filling is temporarily lowered and foaming sometimes begins to occur before the completion of the filling.

The volume of the cavity can be enlarged by, for example, moving the metal mold by means of the molding clamp mechanism of the injection molding machine or moving the slide core attached to the metal mold. Though the metal mold used in the present invention is not particularly limited as long as it can be usually used for injection molding, one capable of arbitrarily changing the volume of the cavity can be used. The volume of the cavity may be changed by manual operation. It is desirable that the change of the volume of the cavity can be controlled by the molding machine or the mechanism of the metal molding by itself. In other words, it is preferable to use an apparatus having such a mechanism that moving and stopping of the metal mold or the slide core can be arbitrarily controlled.

b) First Cooling Step

After the injection and filling of the expandable thermoplastic molding material into the cavity, the molding material is cooled to reach the condition that the surface layer contacted with the surface of the metal mold is solidified and the internal layer is melted (first cooling).

Preferably, the molding material is cooled until when the thickness of the solidified portion of the surface layer becomes the range from 0.2 to 2 mm. Specifically, after completion of the injection and filling, the cooling is effected by retaining the condition of the cavity, which has a 10 to 95% volume of the volume of the desired molded article, for a prescribed period using the cooling mechanism of the metal mold for injection molding. Though the retaining time can be determined empirically depending on the type of the thermoplastic molding material, the size of the molded article, the using metal mold, or the like, it usually ranges from 1 to 20 seconds. If the retaining time is fallen within the above range, the thickness of the surface layer and the foaming rate of the internal layer become satisfiable, and the molded article having excellent rigidity and heat insulating properties can be obtained.

c) Foaming Step

After the above cooling step, the volume of the cavity is enlarged to the volume of the molded article and a part of the melted internal layer is foamed. Namely, the expandable thermoplastic molding material in the melted state begins to foam as the volume is enlarged and the pressure is lowered. However, the already solidified surface layer does not foam if the pressure is lowered and it keeps the dense non-foamed state if the foaming agent is contained. In this way, the multilayer structure portion having the non-foamed surface layer and the foamed internal layer is formed. The portion whose volume does not enlarge when the metal mold is moved becomes a dense non-foamed portion. For example, when a molded article having a bottom part and a side part which makes an angle of 90° against the bottom part is produced using a metal mold which moves in the vertical direction against the bottom part, the volume of the side part is adjusted not to change though the volume of the bottom part enlarges as the metal mold moves so that the bottom part can become the multilayer structure portion and the side part can become the non-foamed portion.

In the case of the molded article having the bottom part and the side part where the slope area is made at the end of the bottom part or the like, if the metal mold which moves in the vertical direction against the bottom part is used, the flat area of the bottom part vertical against the moving direction of the metal mold and the slope area show different proportions of the volume which enlarges as the metal mold moves and, therefore, show different foaming rates. The thus-obtained molded article has a multilayer structure portion containing the foamed layers each having different foaming rates.

d) Second Cooling Step

According to the present invention, the molding material is further cooled (second cooling) after the foaming step and then the resulting molded article is taken out from the metal mold to give the molded article of the present invention. The cooling time is not particularly limited as long as the molded article can be taken out.

BRIEF DESCRIPTION OF THE DRAWINGS

FIG. 1 shows a molded article of Example 1. In FIG. 1, (a) is a front view, (b) is a side view, (c) is a top view, (d) is a perspective view, (e) is a sectional view of the top view (c) at X–X', and (f) is a perspective view of the rigidity test sample cut at Y–Y' and Z–Z' of the front view (a).

In FIG. 2, (I) depicts a state efore mold clamp of the metal mold for injection molding, (II) depicts a state after mold clamp of the metal mold, (III) depicts a state during the first cooling after injection molding of the expandable thermoplastic molding material, (IV) depicts a state during the second cooling of the molded article after the foaming step, and (V) depicts a state of mold opening after the second cooling.

In FIG. 5, (a) is a front view, (b) is a side view, (c) is a top view, (d) is a perspective view, (e) is a sectional view of the top view (c) at X–X', and (f) is a perspective view of the rigidity test sample cut at Y–Y' of the front view (a).

FIG. 6 shows a sectional view of the molded article of Comparative Example 3.

FIG. 7 shows a sectional view of the molded article of Comparative Example 4.

In FIG. 8, (a) is a front view, (b) is a side view, (c) is a top view, (d) is a perspective view, (e) is a sectional view of the top view (c) at X–X', and (f) is a perspective view of the rigidity test sample cut at Y–Y' of the front view (a).

In FIG. 9, (a) is a front view, (b) is a side view, (c) is a top view, (d) is a perspective view, (e) is a sectional view of the top view (c) at X–X', and (f) is a perspective view of the rigidity test sample cut at Y–Y' of the front view (a).

DESCRIPTION OF THE PREFERRED EMBODIMENTS

Figure 2:
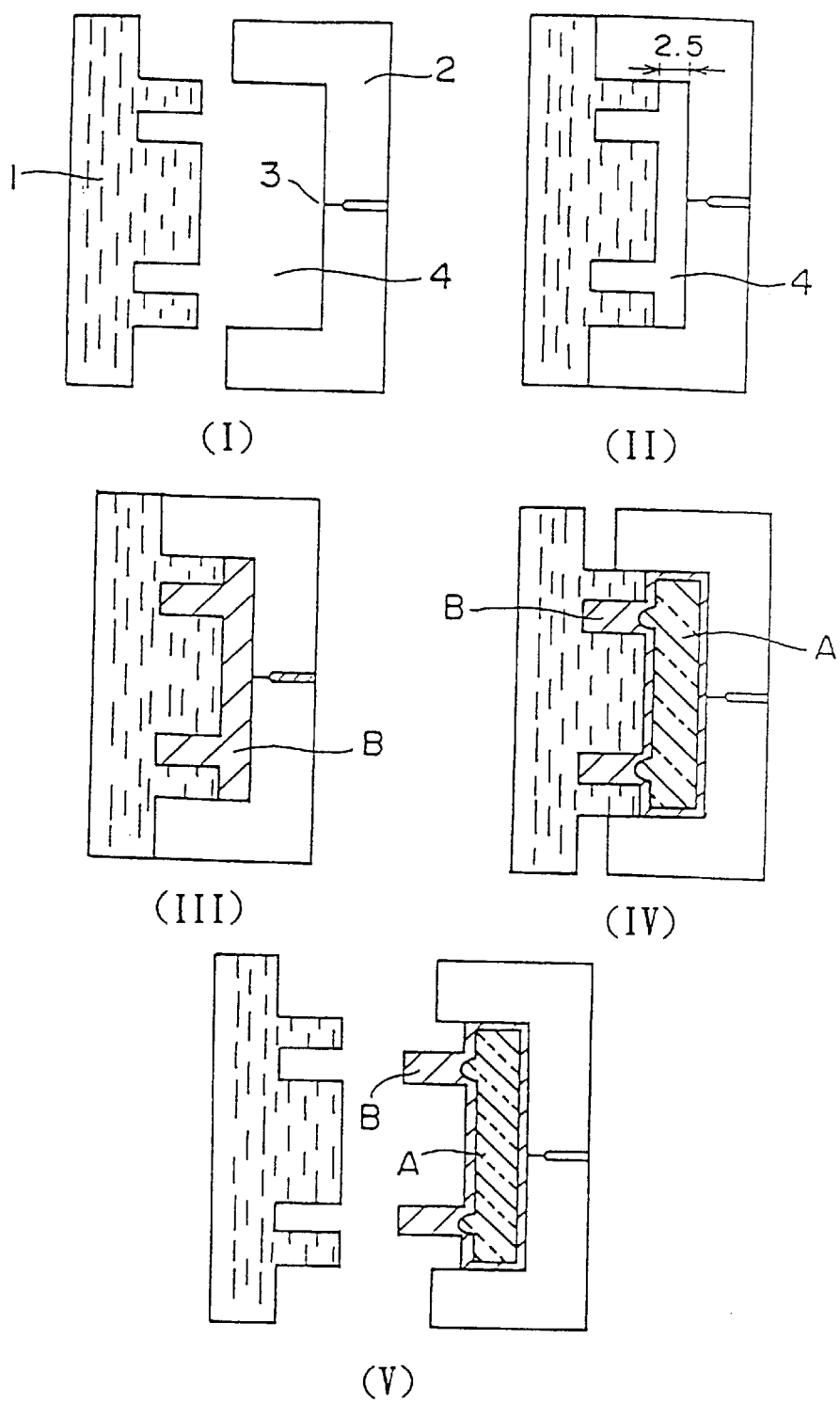
FIG. 2 shows the process of producing the molded article of Example 1.

The present invention will be described in more detail with reference to the following Examples and Comparative Examples. The evaluation methods applied in Examples are as follows.

(1) Heat Insulating Properties

A sample having the size of 50 mm×100 mm was cut out from the bottom part of the molded article and its heat conductivity was measured in accordance with ASTEM-D-2320 (probe method) to regard it as one of the indexes of heat insulating properties (unit: kcal/m·H·° C.). The less the heat conductivity value is, the more excellent heat insulating properties is.

(2) Rigidity

A predetermined sample was cut out from the molded article and was subjected to a bending test in accordance with JIS-K-7203 to determine a maximum bending load which was regarded as one of indexes of rigidity of the molded article. The larger the maximum bending load value is, the more excellent rigidity is.

(3) Lightness

The total weight of the molded article was measured.

(4) Foaming Rate

A sample having the size of 50 mm×100 mm was cut out from the foamed portion of the molded article to measure its specific gravity. Foaming rate in the present description is value which obtained by dividing the specific gravity of the sample from the molded article described above by that of the standard product. The standard product is the molded article obtained from the molding material used in Examples and Comparative Examples, but not containing the foaming agent (only propylene homopolymer) as well as in Comparative Example 2 as described below using the same molding machine, metal mold, and molding conditions except for the step of enlargement of the cavity.

EXAMPLE 1

Propylene homopolymer having the MFR of 4.5 g/10 min and the melting point of 164° C. was mixed with azodicarbonamide with mixing ratio of 98.5 wt %:1.5 wt % (propylene homopolymer:azodicarbonamide) and the mixture was stirred in a tumbler mixer to give a expandable thermoplastic molding material. An injection molding machine equipped with a heating cylinder of which screw diameter was 90 mm and having five band heaters, and a molding clamp controller which had a maximum molding clamping force of 650 T was used. The temperature of each band heater of the heating cylinder was set to 230° C., 230° C., 230° C., 210° C., and 180° C. in this order from the tip part to the rear part. The back pressure and the temperature of cooling water of the metal mold were adjusted to 100 kg/cm$^2$ and 40° C., respectively. The thickness of the cavity (between the mobile mold and the fixed mold), which was corresponding to the bottom part of the molded article, was adjusted to 2.5 mm and the total volume of the cavity was adjusted to 39 cc. Then, 35 g of the above mentioned molding material in a melted state was injected and filled into the cavity. Ten seconds after completion of the injection, the mobile metal mold was moved back by 2.5 mm to give a total volume of the cavity of 68 cc. After cooling for 60 seconds, the molded article was obtained.

The shape of the resulting molded article was shown in FIG. 1. In FIG. 1, (a) is a front view, (b) is a side view, (c) is a top view, (d) is a perspective view, and (e) is a sectional view of the top view (c) at X–X'. In this sectional view, A stands for a foamed part which has foaming rate of 2 and B stands for a non-foamed part.

This molded article has such a structure that the bottom part is a multilayer structure portion constituted by a surface layer composed of a non-foamed part and an internal layer composed of a foamed part and two side parts which are non-foamed portions composed of only non-foamed parts are formed on the upside of the bottom part so as to give an angle between the bottom part and the each side part of 90° respectivery. The thickness of the surface layer of the multilayer structure portion is 0.5 mm. In the figure, the numerals stand for the size (unit: mm) of the molded article (hereinafter the same shall apply).

The method for producing this molded article is demonstrated with reference to FIG. 2.

In FIG. 2, (I) shows the state prior to mold clamping of the metal mold for injection molding used in Example 1, wherein 1 represents a mobile metal mold, 2 represents a fixed metal mold, 3 represents a gate part, and 4 represents a cavity. In the figure, (II) shows the state after mold clamping of the metal mold. In the figure, (III) shows the state during the first cooling after injection and filling of the expandable thermoplastic molding material from the gate 3. In the figure, (IV) shows the state during the second cooling of the molded article after the foaming step. In the figure, (V) shows the state of mold opening after the second cooling.

Namely, at first the thickness of the cavity corresponding to the bottom part of the molded article was adjusted to 2.5 mm and mold clamping was effected (see FIG. 2 (II)) using the metal mold for injection molding composed of the mobile metal mold 1 and the fixed metal mold 2 as shown in FIG. 2 (I). Then, the melted molding material described above was injected and filled into the cavity and cooled for 10 seconds after completion of the injection (first cooling: see FIG. 2 (III)). In this occasion, the molding material was in a non-foamed state (see B in FIG. 2) since it was pressured.

After the first cooling, the mobile metal mold was moved back by 2.5 mm. In this occasion, the surface layer of the part which would become the bottom part was solidified, while the internal layer was in a melted state and thus foamed to form a foamed layer (see A in FIG. 2). The volumes of the parts which would become the side parts were not substantially enlarged to form non-foamed parts. After the foaming step, the mold was cooled for 60 seconds (second cooling: see FIG. 2 (IV)).

After the second cooling, mold opening was effected to take out the molded article (see FIG. 2 (V)). In the molded article shown in FIG. 1, the bottom part was made to have a multilayer structure of the foamed layer and the non-foamed layer and the side parts were made non-foamed parts, by using the above mentioned metal mold.

The results of evaluation of this molded article are shown in Table 1. Further, a perspective view of the sample used for the rigidity test is shown in FIG. 1 (f). This sample was obtained by cutting at Y–Y' and Z–Z' in FIG. 1(a).

COMPARATIVE EXAMPLE 1

Figure 3:
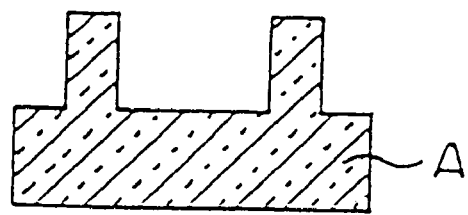
FIG. 3 shows a sectional view of the molded article of Comparative Example 1.

Propylene homopolymer having the MFR of 4.5 g/10 min and the melting point of 164° C. was mixed with azodicarbonamide with mixing ratio of 98.5 wt %:1.5 wt % (propylene homopolymer:azodicarbonamide) and the mixture was stirred in the same manner as in Example 1 to give a expandable thermoplastic molding material. The molding material was molded by usual method for injection and expansion molding using an injection molding machine to obtain a molded article having the foaming rate of 2 and the size of 200 mm×40 mm×150 mm. The resulting molded article was made into the same size of that of Example 1 by cutting or the like. FIG. 3 shows a sectional view of the molded article cut at the same position (X–X' in FIG. 1(c)) as in Example 1. As can be seen in FIG. 3, this molded article is composed of only a foamed part as a whole.

The results of evaluation of this molded article are shown in Table 1. The sample used in the rigidity test was obtained by cutting at the same position (Y–Y' and Z–Z' in FIG. 1(a)) as in Example 1.

COMPARATIVE EXAMPLE 2

Figure 4:
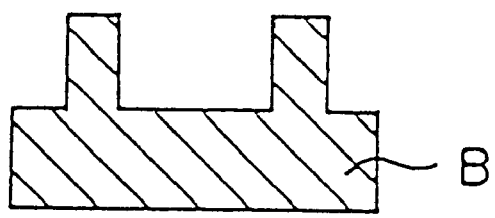
FIG. 4 shows a sectional view of the molded article of Comparative Example 2.

A molded article having the same size as described in Example 1 was obtained using propylene homopolymer having MFR of 4.5 g/10 min and a melting point of 164° C. as a thermoplastic molding material and using the same injection molding machine as in Example 1 without the foaming step. FIG. 4 shows a sectional view of the molded article cut at the same position (X–X' in FIG. 1(c)) as in Example 1. In this molded article, the molding material does not contain a foaming agent and as shown in FIG. 4, both of the surface layer and the internal layer are composed of the non-foamed part.

The result of evaluation of this molded article are shown in Table 1. The sample used in the rigidity test was obtained by cutting at the same position (Y–Y' and Z–Z' in FIG. 1(a)) as in Example 1.

EXAMPLE 2

Propylene homopolymer having the MFR of 4.5 g/10 min and the melting point of 164° C. was mixed with azodicarbonamide with mixing ratio of 98.5 wt %:1.5 wt % (propylene homopolymer:azodicarbonamide) and the mixture was stirred in the same manner as in Example 1 to give a expandable thermoplastic molding material. The same injection molding machine as in Example 1 except for the shape of the mobile mold was used. The temperature of each band heater of the heating cylinder was set to 230° C., 230° C., 230° C., and 210° C. from the tip part and 180° C. at the rear part. The back pressure and the temperature of cooling water of the metal mold were adjusted to 100 kg/cm$^2$ and 40° C., respectively. The thickness of the cavity (between the mobile mold and the fixed mold), which was corresponding to the bottom part of the molded article, was adjusted to 2.5 mm and the total volume of the cavity was adjusted to 39 cc. Then, 35 g of the above mentioned molding material in a melted state was injected and filled into the cavity. Ten seconds after completion of the injection, the mobile metal mold was moved back by 2.5 mm to give a total volume of the cavity of 68 cc. After cooling for 60 seconds, the molded article was obtained.

Figure 5:
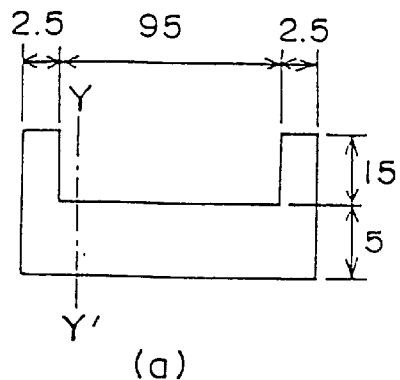
FIG. 5 shows the molded article of Example 2.
Figure 5:
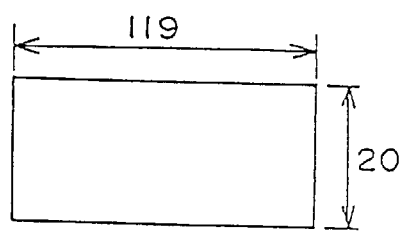
Figure 5:
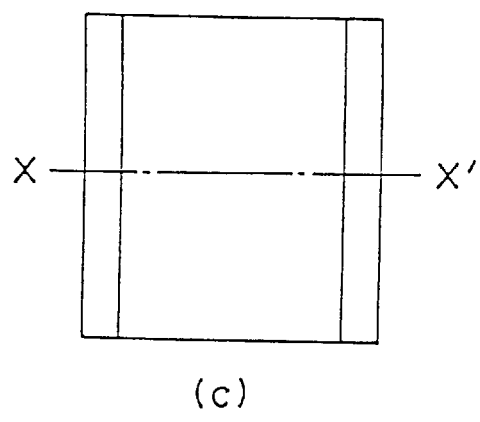
Figure 5:
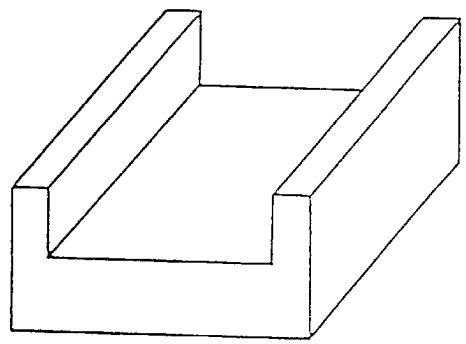
Figure 5:
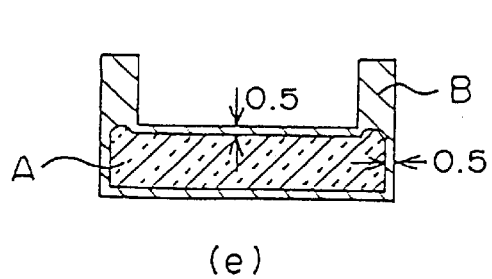
Figure 5:
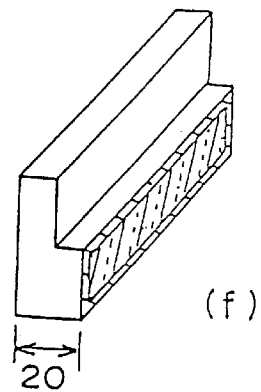

The shape of the resulting molded article was shown in FIG. 5. In FIG. 5, (a) is a front view, (b) is a side view, (c) is a top view, (d) is a perspective view, and (e) is a sectional view of the top view (c) at X–X'. In this sectional view, A stands for a foamed part which has foaming rate of 2 and B stands for a non-foamed part.

This molded article has such a structure that the bottom part is a multilayer structure portion constituted by a surface layer composed of a non-foamed part and an internal layer composed of a foamed part and two side parts composed of only non-foamed parts are formed on the both ends of the upside of the bottom part so as to give an angle between the bottom part and the each side part of 90° respectively. The thickness of the surface layer of the multilayer structure portion is 0.5 mm.

The results of evaluation of this molded article are shown in Table 1. Further, a perspective view of the sample used for the evaluation of rigidity is shown in FIG. 5(f). This sample was obtained by cutting at Y–Y' in FIG. 5(a).

COMPARATIVE EXAMPLE 3

Propylene homopolymer having the MFR of 4.5 g/10 min and the melting point of 164° C. was mixed with azodicarbonamide with mixing ratio of 98.5 wt %:1.5 wt % (propylene homopolymer:azodicarbonamide) and the mixture was stirred in the same manner as in Example 2 to give a expandable thermoplastic molding material. The molding material was molded by usual method for injection and expansion molding using an injection molding machine to obtain a molded article having the foaming rate of 2 and the size of 200 mm×40 mm×150 mm. The resulting molded article was made into the same size of that of Example 2 by cutting or the like. FIG. 6 shows a sectional view of the molded article cut at the same position (X–X' in FIG. 5(c)) as in Example 2. As can be seen in FIG. 6, this molded article composed of only a foamed part as a whole. The results of evaluation of this molded article are shown in Table 1. The sample used in the rigidity test was obtained by cutting at the same position (Y–Y' n FIG. 5(a)) as in Example 2.

COMPARATIVE EXAMPLE 4

A molded article having the same size as described in Example 2 was obtained using propylene homopolymer having MFR of 4.5 g/10 min and a melting point of 164° C. as a thermoplastic molding material and using the same injection molding machine as in Example 2 without the foaming step. FIG. 7 shows a sectional view of the molded article cut at the same position (X–X' in FIG. 5(c)) as in Example 2. In this molded article, the molding material does not contain a foaming agent and as shown in FIG. 7, both of the surface layer and the internal layer are composed of the non-foamed part. The result of evaluation of this molded article are shown in Table 1. The sample used in the rigidity test was obtained by cutting at the same position (Y–Y' in FIG. 5(a)) as in Example 2.

EXAMPLE 3

Propylene homopolymer having the MFR of 4.5 g/10 min and the melting point of 164° C. was mixed with azodicarbonamide with mixing ratio of 98.5 wt %:1.5 wt % (propylene homopolymer:azodicarbonamide) and the mixture was stirred in the same manner as in Example 1 to give a expandable thermoplastic molding material. The same injection molding machine as in Example 1 except for the shape of the mold was used. The temperature of each band heater of the heating cylinder was set to 230° C., 230° C., 230° C., and 210° C. from the tip part and 180° C. at the rear part. The back pressure and the temperature of cooling water of the metal mold were adjusted to 100 kg/cm$^2$ and 40° C., respectively. The thickness of the cavity (between the mobile mold and the fixed mold), which was corresponding to the bottom part of the molded article, was adjusted to 2.5 mm and the total volume of the cavity was adjusted to 34 cc. Then, 31 g of the above mentioned molding material in a melted state was injected and filled into the cavity. Ten seconds after completion of the injection, the mobile metal mold was moved back by 2.5 mm to give a total volume of the cavity of 64 cc. After cooling for 60 seconds, the molded article was obtained.

Figure 8:
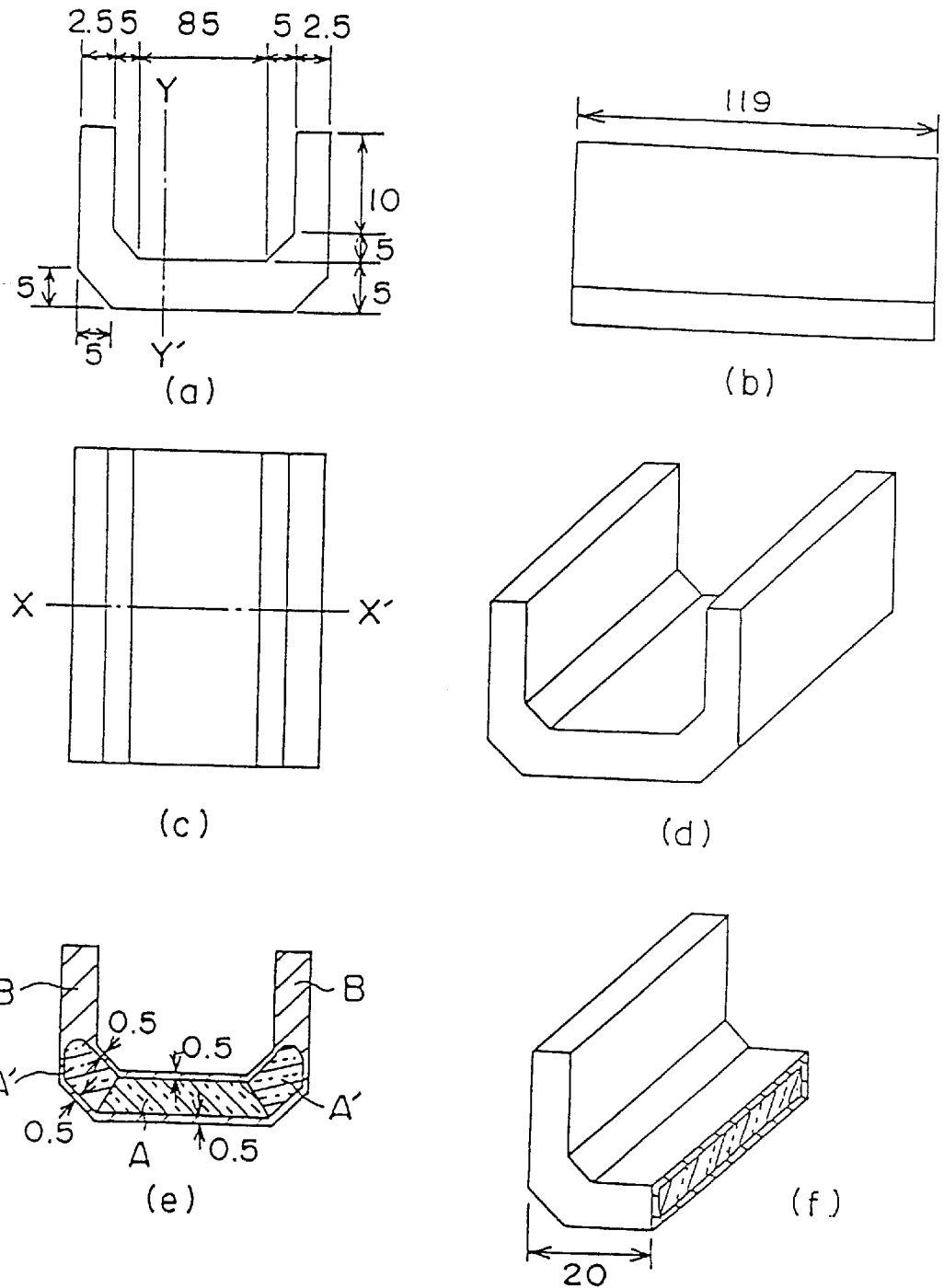
FIG. 8 shows the molded article of Example 3.

The shape of the resulting molded article was shown in FIG. 8. In FIG. 8, (a) is a front view, (b) is a side view, (c) is a top view, (d) is a perspective view, and (e) is a sectional view of the top view (c) at X–X'. In this sectional view, A stands for a foamed part showing the foaming rate of 2, A' for a foamed part showing the foaming rate of 1.7, and B stands for a non-foamed part.

This molded article has a bottom part, side parts which make an angle of 90° against the bottom part, and a slope part at the boundary of the bottom part and the side parts, and its sectional view shows a U-shape. The bottom part and the slope part are constituted by surface layers composed of non-foamed parts and internal layers composed of foamed parts and the foaming rate of the foamed part in the bottom part is higher than that of the slope part. The side parts are composed of only non-foamed parts. The thickness of each of the surface layer is 0.5 mm.

The results of evaluation of this molded article are shown in Table 1. Further, a perspective view of the sample used for the evaluation of rigidity is shown in FIG. 8(f). This sample was obtained by cutting at Y–Y' in FIG. 8(a).

EXAMPLE 4

Propylene homopolymer having the MFR of 4.5 g/10 min and the melting point of 164° C. was mixed with azodicarbonamide with mixing ratio of 98.5 wt %:1.5 wt % (propylene homopolymer:azodicarbonamide) and the mixture was stirred in the same manner as in Example 1 to give a expandable thermoplastic molding material. The same injection molding machine as in Example 1 except for the shape of the mold was used. The temperature of each band heater of the heating cylinder was set to 230° C., 230° C., 230° C., and 210° C. from the tip part and 180° C. at the rear part. The back pressure and the temperature of cooling water of the metal mold were adjusted to 100 kg/cm² and 40° C., respectively. The thickness of the cavity (between the mobile mold and the fixed mold), which was corresponding to the bottom part of the molded article, was adjusted to 2.5 mm and the total volume of the cavity was adjusted to 48 cc. Then, 43 g of the above mentioned molding material in a melted state was injected and filled into the cavity. Ten seconds after completion of the injection, the mobile metal mold was moved back by 2.5 mm to give a total volume of the cavity of 78 cc. After cooling for 60 seconds, the molded article was obtained.

Figure 9:
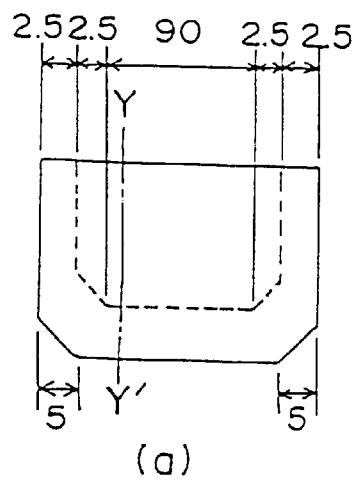
FIG. 9 shows the molded article of Example 4.
Figure 9:
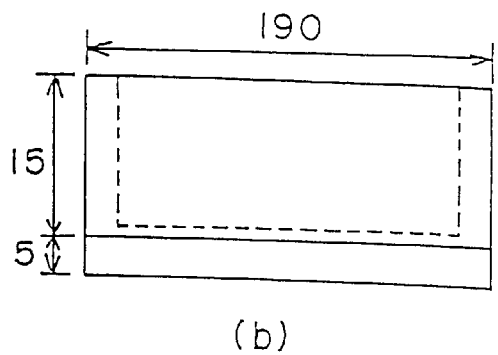
Figure 9:
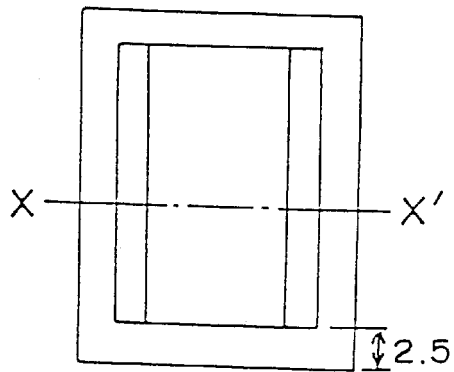
Figure 9:
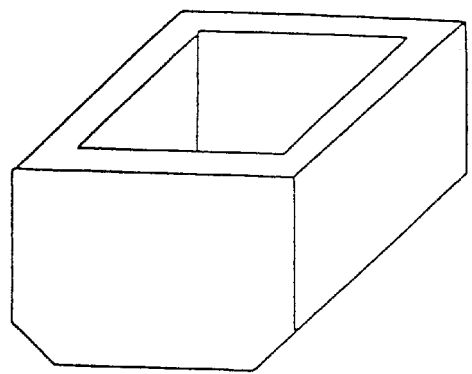
Figure 9:
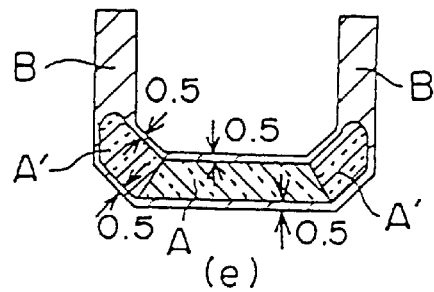
Figure 9:
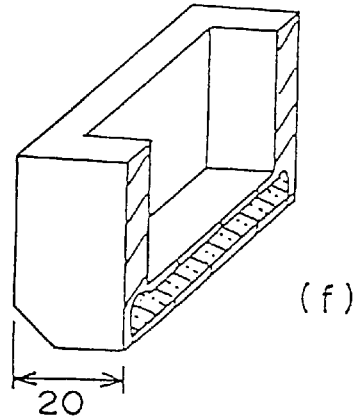

The shape of the resulting molded article was shown in FIG. 9. In FIG. 9, (a) is a front view, (b) is a side view, (c) is a top view, (d) is a perspective view, and (e) is a sectional view of the top view (c) at X–X'. In this sectional view, A stands for a foamed part showing the foaming rate of 2, A' for a foamed part showing the foaming rate of 1.7, and B stands for a non-foamed part.

This molded article is a box-type molded article having a bottom part, four side parts (two sets) which make an angle of 90° against the bottom part, and a slope part at the boundary of the bottom part and the side parts. The bottom part and the slope part are constituted by surface layers composed of non-foamed parts and internal layers composed of foamed parts and the foaming rate of the foamed part in the bottom part is higher than that of the slope part. The side parts are composed of only non-foamed parts. The thickness of each of the surface layer is 0.5 mm.

The results of evaluation of this molded article are shown in Table 1. Further, a perspective view of the sample used for the evaluation of rigidity is shown in FIG. 9(f). This sample was obtained by cutting at Y–Y' in FIG. 9(a).

TABLE 1

|  | Heat insulating properties kcal/m · H · ° C. | Rigidity (N) | Lightness (g) (Volume) |
| --- | --- | --- | --- |
| Example 1 | 0.08 | 390 | 35 (68 cc) |
| Comparative Example 1 | 0.08 | 220 | 31 (68 cc) |
| Comparative Example 2 | 0.22 | 430 | 62 (68 cc) |
| Example 2 | 0.08 | 350 | 35 (68 cc) |
| Comparative Example 3 | 0.08 | 180 | 31 (68 cc) |
| Comparative Example 4 | 0.22 | 410 | 62 (68 cc) |

TABLE 1-continued

|  | Heat insulating properties kcal/m · H · ° C. | Rigidity (N) | Lightness (g) (Volume) |
| --- | --- | --- | --- |
| Example 4 |  |  |  |
| Example 3 | 0.08 | 340 | 35 (64 cc) |
| Example 4 | 0.08 | 350 | 43 (78 cc) |

As can be seen from the results of the above Examples, the molded articles of Comparative Example 1 and Comparative Example 3 both of which are composed of only the foamed parts are excellent in heat insulating properties and lightness but are inferior in rigidity. On the other hand, the molded articles of Comparative Example 2 and Comparative Example 4 are excellent in rigidity but exert low heat insulating properties and poor lightness since their weights are heavy. In contrast, the molded articles of Examples 1 to 4 show high heat insulating properties, excellent rigidity, and can keep lightness.

What is claimed is:

1. A method for producing a molded article by subjecting a thermoplastic molding material to injection molding using an injection molding machine equipped with a metal mold and a heating cylinder, which comprises:

a) an injection step in which an expandable thermoplastic molding material melted in the heating cylinder that is adjusted to set the temperature of its tip part to be higher by 20 to 100° C. than that of its rear part, is injected and filled into a cavity of the metal mold having a volume of 10 to 95% of the volume of the molded article;

b) a first cooling step in which, after injection and filling, the molding material is cooled to give such a condition that a surface layer contacted with the metal mold is solidified, while an internal layer is melted;

c) a foaming step in which, after cooling, the volume of the cavity is enlarged to the volume of the molded article to foam a part of the internal layer; and d) a second cooling step in which, the molding material is further cooled and then the resulting molded article is taken out from the metal mold.

2. A method as claimed in claim 1, wherein the back pressure of said heating cylinder is set to not less than 50 kg/cm² in said injection step.

* * * * *